March 31, 1970     E. H. FISHER     3,503,132
HYDRAULIC MECHANICAL ELECTRICAL SENSING DEVICE
Original Filed April 2, 1965     3 Sheets-Sheet 1
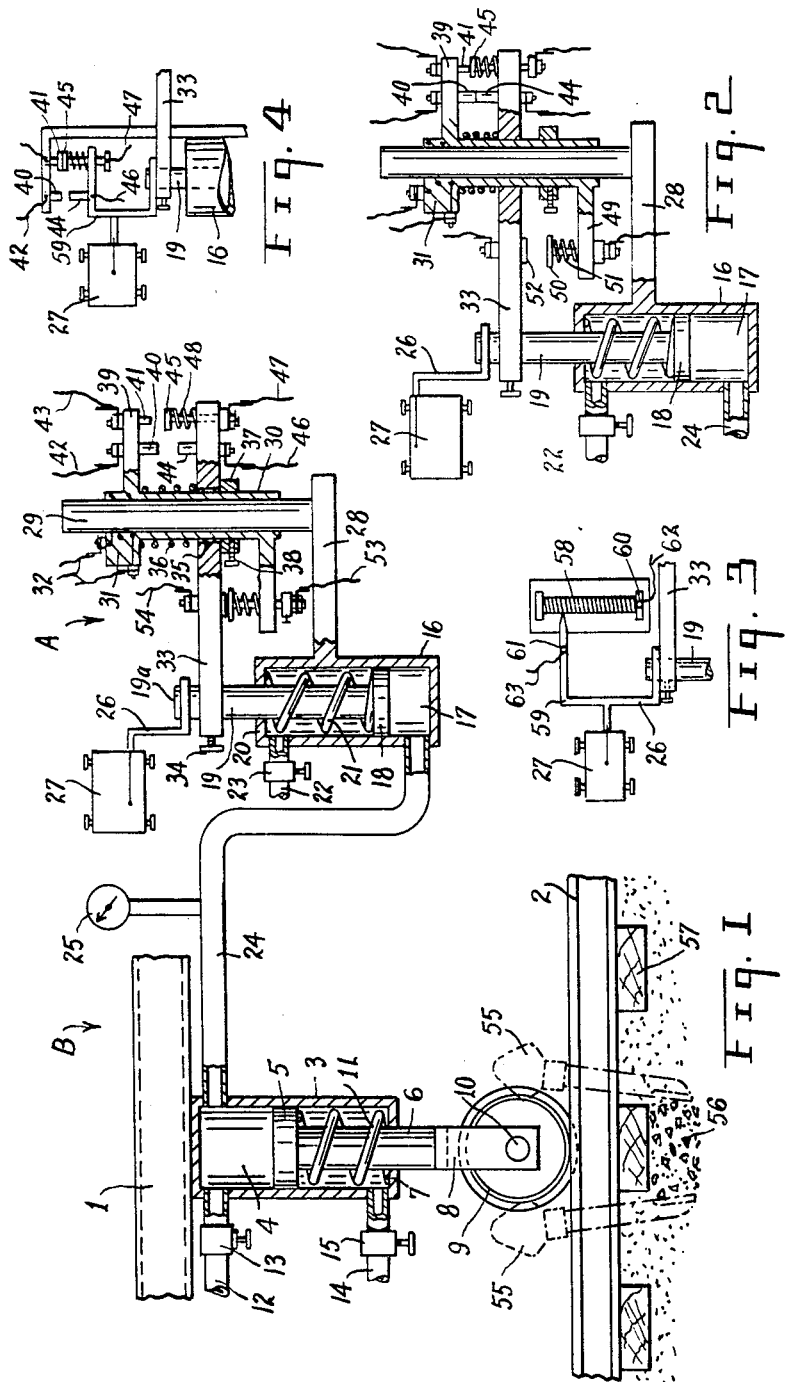
INVENTOR
E. H. FISHER March 31, 1970   E. H. FISHER   3,503,132
HYDRAULIC MECHANICAL ELECTRICAL SENSING DEVICE
Original Filed April 2, 1965   3 Sheets-Sheet 2
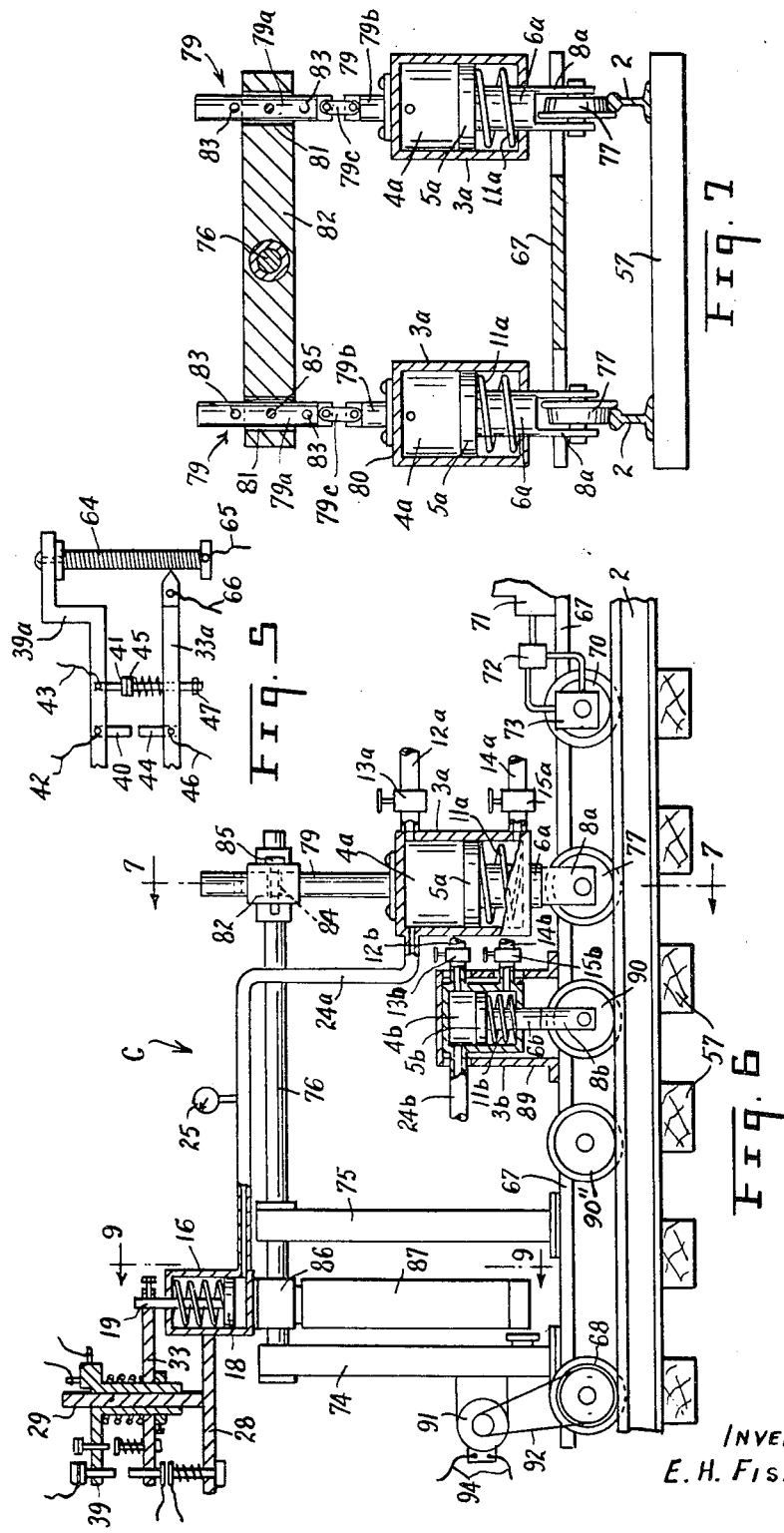
INVENTOR
E. H. FISHER March 31, 1970   E. H. FISHER   3,503,132
HYDRAULIC MECHANICAL ELECTRICAL SENSING DEVICE
Original Filed April 2, 1965   3 Sheets-Sheet 3

INVENTOR
E. H. FISHER

United States Patent Office 3,503,132
Patented Mar. 31, 1970

3,503,132
HYDRAULIC MECHANICAL ELECTRICAL
SENSING DEVICE
Earl H. Fisher, 630 Casgrain Ave., St. Lambert,
Montreal, Quebec, Canada
Original application Apr. 2, 1965, Ser. No. 445,123, now
Patent No. 3,364,579, dated Jan. 23, 1968. Divided
and this application Nov. 22, 1967, Ser. No. 721,885
Int. Cl. E01b 29/04
U.S. Cl. 33—146                               1 Claim

ABSTRACT OF THE DISCLOSURE

A device for measuring the distance between two rails and also the straightness of the rails by means of hydraulic sensors and indicators. The hydraulic cylinder for sensing the gage of the rails is in axial alignment with the cylinder for sensing the horizontal alignment so that only one piston rod is needed.

---

This is a division of application Ser. No. 445,123, filed Apr. 2, 1965.

This invention relates to a sensing device and more particularly to a device which senses the contour of a surface.

In certain instances it is desired to determine the variation of a given surface from a normal or datum line. By way of illustration and not limitation in railway construction or maintenance it is necessary to find the amount that a length of rail varies, at any given point on its length, above or below either an average or a prescribed level (cross and longitudinal) or whether the rails are to the prescribed gauge and alignment. Where the surface of the rail is found to vary from the desired datum line in either the vertical or horizontal plane, the "level" change in the level and/or alignment of an individual rail or rails can then be adjusted. When the amount of variation can be determined, the degree of adjustment can be calculated. The problem of varying contour is especially acute where tamping, lining and gauging devices are used to jack, level, line and gauge the rails, as well as, compact the ballast beneath rail ties as prescribed.

The present invention allows automatic sensing of the contour of surfaces by means of a device adapted to travel over the surface and sense the variation in height of any given datum line. Consequently, suitable adjustment or control in the laying or maintenance of the surface, line or gauge, of such as a railway track is made possible.

The invention in its broadest aspect consists of a device for sensing the contour of a surface comprising a frame, means movably supporting the frame on the surface, means fixed to the frame at a position spaced from the supporting means and carrying a movable rigid element adapted to follow the contour of the surface, and means adapted to respond to the movement of the rigid element to indicate variation in the contour of the surface. In a preferred embodiment the fixed means comprises a closed cylinder with a piston reciprocable in it, while the movable element comprises a rod carried by the piston and projecting towards the surface. The indicating means may be a stylus marking a moving graph or it may be one or more pairs of contacts adapted to open or close or a resistance device which measures resistance with respect to a distance travelled, all of which may actuate an appropriate signal, to start or stop an operation, be fed into a computer for immediate or future analysis and/or be used in the form of punch card or tape. Furthermore the information can be fed into a computer along with other suitable data concerning train speeds, volume of traffic, weight of rail, and axle loading, etc. A computer will make a new tape or card from this combined information which will provide the most economical correction or corrections available from the variables fed into it. In addition variable factors such as train speeds, volume of traffic, weight of rail, and axle loadings, etc., can be fed into a computer and the minimum track standard taking these variables into account can be provided by the computer. The receiving unit on the corrective machine can be adjusted accordingly and corrections made in accordance with this predetermined minimum. The information can be recorded with respect to distance, time, or by fixed objects such as metal which will permit a signal to be made when they are contacted or sensed. It follows that the information can be fed back in like manner indicating what and the extent that corrections to the surface or surfaces that are to be made. In addition, the information can be used to be fed into a device which will mark sense the surface either for immediate or future corrective action. Preferably, the indicating means is associated with the piston and rod of a second closed cylinder having its chamber communicating with the first closed cylinder whereby variations in the surface causing the piston in the first cylinder to reciprocate will in turn cause the piston in the second cylinder to reciprocate in like manner. It follows that either the surface or surfaces to be sensed may move or the unit performing the sensing function or functions.

Examples of embodiments of the invention will now be described with reference to the accompanying drawings in which:

FIG. 1 is a view in elevation of the device, with the elements partially in cross-section, associated with a rail.

FIG. 2 is a view of the reaction cylinder and associated contact means of FIG. 1 with the contact means in closed position.

FIG. 3 is a resistance device from which ohms can be recorded and, therefore, be converted to distance, and is attached to the piston rod of the receiving unit.

FIG. 4 shows a contact point arrangement attached to the piston rod of the receiving unit.

FIG. 5 is a resistance device attached to the contact point arms shown in FIG. 2.

FIG. 6 illustrates a machine using the devices of FIGS. 1 and 2 for sensing the cross and longitudinal level as well as the alignment and gauge of a surface or surfaces with respect to distance travelled on a railroad track. In this case a railroad track is used for illustrative purposes.

FIG. 7 is a cross section on the line 7—7 of FIG. 6 showing that portion of the sensing device used for cross level that comes in contact with the rails.

Figure 9:
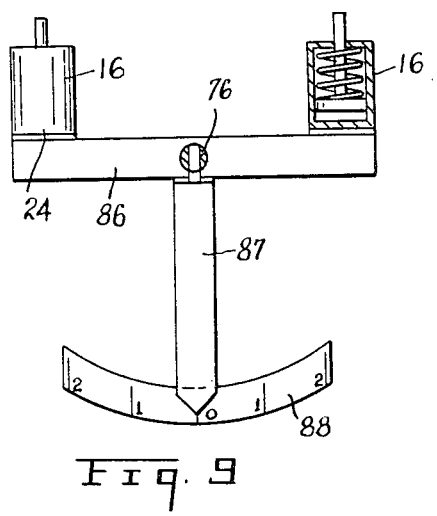
FIG. 9 is a transverse elevation of a pendulum means to which the receiving portions of the sensing devices are attached.

The machine B illustrated in FIGS. 1 and 2 comprises a frame 1 which is mounted on a pair of wheels (not shown) running on a track or rails 2. Supported by, and fixed to, the underside of frame 1 directly above each of the track rails 2 is a closed cylinder 3 having a chamber 4 and a piston 5 adapted to oscillate longitudinally within chamber 4. A piston rod 6 fixed to piston 5 extends through the lower end wall 7 of cylinder 3 and terminates in a bracket 8. A flanged wheel 9 is journalled in bracket 8 by means of axle 10. Piston 5 is return biased by a compression spring 11 bearing at one end against piston 5 and at the other end against end wall 7 of cylinder 3. A conduit 12 leads into chamber 4 of cylinder 3 above piston 5 and is controlled by a cut-off valve 13. A second conduit 14 leads into chamber 4 below piston 5 and is controlled by a cut-off valve 15.

A second closed cylinder 16 is also fixed to frame 1 by suitable means (not shown). Chamber 17 enclosed by cylinder 16 contains a piston 18 adapted to oscillate longitudinally within the chamber. A piston rod 19 fixed to piston 18 extends upwardly through end wall 20 of cylinder 16. Piston 18 is return biased by a compression spring 21 bearing at one end against piston 18 and at the other end against end wall 20. Spring 21 is stronger than spring 11. A conduit 22 opens into chamber 17 above piston 18 and is controlled by a cut-off valve 23.

Conduits 12, 14 and 22 lead from one or more sources of pressurized hydraulic fluid. A conduit 24 connects cylinders 3 and 16, opening at one end into chamber 4 above piston 5 and at the other end into chamber 17 below piston 18. Conduit 24 includes a pressure gauge 25.

A stylus arm 26 is fixed to piston rod 19 adjacent its free end 19a and is associated with a movable graph roll 27.

Integral with cylinder 16 and extending laterally from it is an arm 28 carrying a fixed upright post 29 which in turn carries a sleeve 30 slidable on the post. The upper end of sleeve 30 terminates in an electromagnet 31 fed by leads 32.

An arm 33 is also fixed adjacent the free end 19a of piston rod 19 and extends laterally in the direction of post 29 and sleeve 30. Arm 33 is adjustable on rod 19 by means of a set screw 34. Also, an aperture 35 in arm 33 enables the arm to be slidable along sleeve 30 (and post 29). Sleeve 30 carries a compression spring 36 which bears at one end against arm 33 and at the other end against shoulders formed by electromagnet 31. Below arm 33, sleeve 30 also carries a slidable collar 37 adjustably clamped to the sleeve by a set screw 38.

An arm 39, extending laterally from sleeve 30 and integral with it, carries a pair of contact points 40 and 41 served by leads 42 and 43 respectively. On arm 33 a second pair of contact points 44 and 45 are juxtapositioned with respect to contact points 40 and 41 respectively. Points 44 and 45 are served by leads 46 and 47 respectively. Contact 45 is spring biased by a compression spring 48. The gap between points 41 and 45 is less than that between points 40 and 44.

A further arm 49, integral with sleeve 30 and extending laterally from it below arm 33, carries a contact 50 biased by compression spring 51. A mating contact 52 is fixed on arm 33. Contacts 50 and 52 are served by leads 53 and 54 respectively.

The device is shown in FIG. 1 as it may be used in conjunction with a tamper having arms 55 which are adapted to compact ballast 56 beneath ties 57 and also, if necessary, raise the level of rail 2.

If the device is to be used in conjunction with a tamper, contact points 41 and 45 are adjusted to a prescribed amount. The sensing device is spotted over a tie 57, as shown in FIG. 1. The electromagnet 31 is de-energized permitting the spring 36 to a zero compressibility thereby establishing the prescribed opening of contact points 41 and 45. The electromagnet 31 is now energized and sleeve 30 is locked with respect to shaft 29. The tamping action is now started and the tamping arms 55 force ballast under the tie 57, tie 57 and rails 2 are then forced upwards. This upward movement of tie and rails forces the piston assembly 5 upwards in the chamber 4 which, in turn, raises piston 18 in cylinder 16 and arm 33 is moved against the compression spring 36. The electromagnet 31 being locked with respect to shaft 29 allows the gap between contacts 41 and 45 to close. When these contacts 41 and 45 close a signal goes on such that a light or the tamper cycle is automatically stopped.

FIGS. 3, 4 and 5 show various types of recording devices that can be attached to members of the recording unit A of the device for recording or other purposes.

FIG. 3 shows a resistance device 58 which is fixed with respect to the piston rod 19. A movable resistance arm 59 is an extension of the arm 26 and moves up and down with the movement of piston rod 19. The resistance will vary directly as distance between the terminals 60 and 61, which can be read as ohms and converted to distance. Leads 62 and 63 can be fed into a computer or interrupt a signal record on punch card or tape, etc.

FIG. 4 shows a contact point arrangement attached to arm 59 in lieu of the resistance 58 in FIG. 3. The contact point arrangement here shown is similar to the arrangement of contact points 40–44 and 41–45 shown in FIGS. 1 and 2. Again the leads 42–46 and 43–47 can be used as in FIGS. 1 and 2.

FIG. 5 shows a resistance assembly in which the resistance 64 is secured at one end to the arm 39a which is an extension of the arm 39 of FIGS. 1 and 2, and the movable resistance arm 33a is an extension of the arm 33 of FIGS. 1 and 2. Again, the information from the leads 65 and 66 can be used as from the leads 62 and 63 in FIG. 3.

While a simple type of resistance unit is shown in FIGS. 3 and 5 this is for illustrative purposes only and a linear motion potentiometer could for example be used in practice.

In FIGS. 6 and 7 the machine C, a self-propelled track recording machine incorporating the sensing device for cross and longitudinal level, gauge and alignment purposes, is illustrated.

The track recording machine consists of a frame 67 supported by the wheel assemblies 68, 90 and 70 on the rails 2 and ties 57. The machine is self-propelled by means of the prime mover 71 driving the hydraulic pump 72 which, in turn, drives the hydraulic motor 73 which turns the flanged wheel assembly 70.

An upright frame consisting of the two members 74 and 75 is mounted on top of the frame 67 and journals the horizontally disposed shaft 76.

A pair of double acting cylinders 3a similar to the cylinder 3 in FIG. 1 are located on either side of the frame 67 between the wheels 90 and 70. Each cylinder 3a has a chamber 4a, piston 5a, piston rod 6a extending downwards from the piston 5a and terminating in a bracket 8a supporting a flanged wheel 77 running on the rail 2. The piston 5a is return biased by the compression spring 11a exactly as in the cylinder 3 in FIG. 1. A conduit 12a leads into chamber 4a of the cylinders 3a above the pistons 5a and is controlled by the cut-off valve 13a. A second conduit 14a leads into chamber 4a of the cylinders 3a below the piston 5a and is controlled by a cut-off valve 15a, and a conduit 24a leads out from the chamber 4a above the pistons 5a exactly as with the cylinder 3 in FIG. 1.

A shaft 79 extends vertically upwards from the top wall 80 of each of the cylinders 3a. This shaft is made in two parts 79a and 79b, connected together by links 79c. The upper part 79a of the shafts 79 passes through the apertures 81, in the crossbar 82 which is mounted on the end of the horizontal shaft 76 opposite from the brackets 74 and 75. The upper part 79a of the shafts 79 are each provided with a series of transverse apertures 83 for alignment with the apertures 84, in the crossbar 82. The shafts 79 can be adjusted relative to the crossbar 82 by means of the pins 85 passing through the apertures 83 and 84.

A crossbar 86 secured on the shaft 76 between the frame members 74 and 75 has suspended from its underside the heavy pendulum 87. The pendulum 87 keeps the cross arms 82 and 86 in a horizontal position at all times and is located as close as practical to the rear wheels 68. A quadrant 88 is mounted on the rear vertical bracket 74 at a position adjacent the lower end of the pendulum 87.

A pair of receiving units A, similar to the receiving unit A shown in FIG. 1, are mounted at the extreme ends of the crossbar 86, with the cylinders 16 being mounted directly on the crossbar as shown in FIGS. 6 and 9.

The cylinders 3a and 16 on one side of the track recording machine are connected together by one conduit 24a and the cylinders 3a and 16 on the other side of the machine are connected together by a similar conduit 24a, thereby providing independent recording at the separate receivers A, of vertical movement of each wheel 77 by variation of alignment of the rails 2 from a set datum. The recording receivers A in FIG. 6 can, of course, be modified to make use of the devices shown in FIGS. 3, 4 and 5.

The pendulum 87 will provide an immediate visual indication of variation of alignment of the rails 2 from the horizontal simultaneous with the recording of the rail setting at the receivers A.

A second pair of double acting cylinders 3b are attached to the machine frame 67 by means of the brackets 89 and are similar to the cylinders 3 and 3a. Each cylinder 3b has a chamber 4b, piston 5b, piston rod 6b extending downwards from the piston 5b and terminating in a bracket 8b supporting a flanged wheel 90 running on the rails 2. The piston 5b is return biased by the compression spring 11b exactly as in the cylinders 3 and 3a. A conduit 12b leads into the chamber 4b of the cylinder 3b above the piston 5b and is controlled by the cut-off valve 13b. A second conduit 14b leads into the chamber 4b of the cylinders 3b below the piston 5b and is controlled by the cut-off valve 15b, and a conduit 24b leads out from the chamber 4b above the piston 5b to a cylinder and receiving device A (not shown) similar to the cylinder 16 and recording unit A shown in connection with cylinder 3a.

The device 91 is driven by the drive 92 from the rear wheels 68 and will be activated according to distance traveled by the machine and will pass a signal to a computer or recording device through the leads 94.

Figure 8:
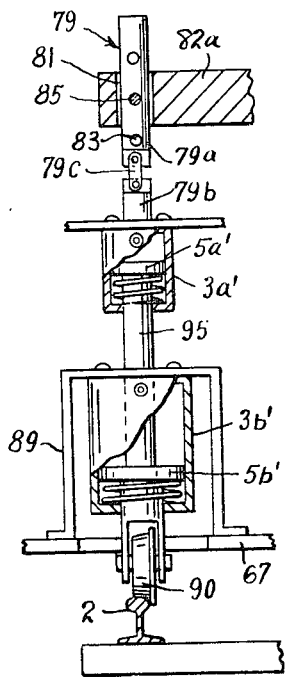
FIG. 8 is a vertical transverse section of a combined single unit sensing device for longitudinal and cross level sensing.

In FIG. 8 of the drawings there is shown an arrangement in which the cylinders 3a and 3b are incorporated as a single unit. In this particular arrangement the cylinder 3a' is located axially above the cylinder 3b'. Pistons 5a' and 5b' are connected together by the connecting rod 95 and the cylinder 3a' is connected to the crossbar 82a by the shaft 79a in the same manner as is shown in FIG. 7.

Figure 10:
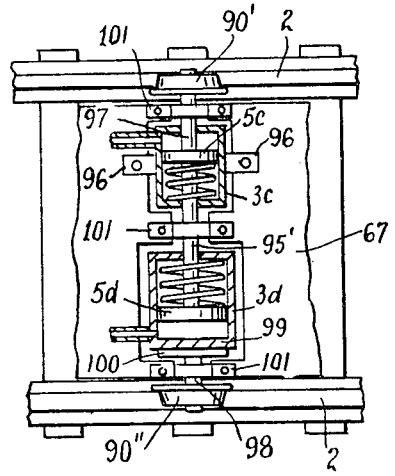
FIG. 10 is a plan view in section of the device used to determine gauge and alignment of a railroad track.

In FIG. 10 there is shown an arrangement of coupled cylinder devices which is basically the same as that shown in FIG. 8. In this arrangement the cylinders 3c and 3d are disposed horizontally, with the cylinder 3c being secured to the machine frame 67 by means of the brackets 96. The pistons 5c and 5d are connected together by the connecting rod 95' while the flanged wheel 90' is freely journalled on the piston rod 97. An axially disposed shaft 98 is secured to end wall 99 of the cylinder 3d by the flange 100. The flanged wheel 90" is freely journalled on the shaft 98. Suitable brackets 101 hold the shafts 95', 97 and 98 in axial horizontal alignment relative to the frame 67 and restrain the shafts against rotation. However, these shaft 95', 97 and 98 are free for lateral movement along with the wheels 90' and 90".

Figure 11:
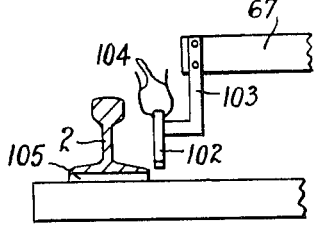
FIG. 11 is a metal sensing device for sensing the tie plate of a rail.

In FIG. 11 there is shown a metal proximity sensing device 102 mounted on a bracket 103 attached to the machine frame 67. A pair of leads 104 on the device 102 connect with a computer or other recording or signalling means when the device 102 comes close to or contacts a metal object such as the tie plate 105 of the rail 2.

The operation of this invention will be described as it relates to a tamping machine used in the setting up of railroad tracks and in the use of a machine adapted to travel over a surface, such as railroad tracks, which will sense and record the variations in height or gauge of railroad tracks from a given datum line so that corrections can be made such as by a tamping machine. However, it should be understood that the automatic sensing accomplished by the described machine can be used whenever adjustments in any type of surfaces have to be made relative to a given datum line.

In the operation of the above described devices and referring first to FIGS. 1 to 5 in the drawings, hydraulic fluid is forced under pressure through line 12 into chamber 4 of cylinder 3 and by way of line 24 into chamber 17 of cylinder 16. Since spring 21 is stronger than spring 11, piston 5 is forced downward bringing wheel 9 into contact with rail 2. The weight of frame 1 prevents further movement of piston 5 within cylinder 3 and consequently a further increase in pressure of the hydraulic fluid entering from line 12 will force piston 18 upwardly in cylinder 16. If desired, the pressure of contact of wheel 9 on rail 2 may be varied by adjusting the pressure of hydraulic fluid behind piston 5 by means of line 14 and valve 15. Similarly, the upward pressure of piston 18 may be controlled by line 22 and valve 23. When a predetermined pressure of the hydraulic fluid within the system has been reached (indicated by gauge 25), cut-off valve 13 is closed stabilizing piston 18. Collar 37 is then brought into abutment with arm 33 and locked to sleeve 30 by set screw 38. Finally, electromagnet 31 is actuated to lock sleeve 30 on post 29.

The device is now ready to function as frame 1 moves along rail 2. Using the two points of contact of the front and rear wheels (not shown) of frame 1 as a datum line, any vertical deviation of the rail from such line will cause piston 5 to move within cylinder 3. Since the fluid within the system is non-compressible the movement of piston 5 will be translated immediately into a movement of piston 18 in cylinder 16. Thus when piston 5 rises, piston 18 will also rise and the movement will be recorded on moving graph 27 by stylus 26. Consequently, a continuous graph of the rises of the surface of the rail above the given datum line will be recorded. Depressions of the rail will not be recorded because of collar 37 locked to sleeve 30.

As pistons 5 and 18 rise, arm 33 will also move against the action of compression spring 36. This movement of arm 33 will open contacts 50, 52 and then close contacts 41, 45 and 40, 44 in that order. It will be obvious that a series of make and break contacts on arms 33 and 39 with the gaps between each pair of contacts calibrated to intervals of an ascending order would, if the signals produced by the closing of each gap were fed into a computer, enable calculations to be made, for instance to establish an optimum datum line.

Referring now to FIGS. 6 to 11, the machine C particularly shown in FIGS. 6 and 7 is primarily a recording machine which will run ahead of a tamper machine. This recording machine is preferably self propelled and runs at a relatively slow speed. The cylinder devices 3a and 3b operate in the same manner as do the cylinders 3 and 16 in FIG. 1 to record information at the recording unit A such as sensing cross and longitudinal level, gauge and alignment of the two rails 2 over which the machine travels. The information fed into the receivers A can be fed directly backwards to the following tamper machine or it can be recorded on tape or punch cards which, in turn, can be fed into a computer on the tamper machine for use later.

The machine C will, by means of the device 91 record distance and time which also can be fed into a corrective device or a computer on to the tamping machine for immediate or later use of a separate computer for analyzing in conjunction with other variables providing new punch cards, tape means, etc. in order that the tamper can be operated at an exact location along a predetermined length of rail to correct cross and longitudinal level, gauge and alignment defects detected by the machine.

In FIGS. 6 and 9 the cylinders 16 and, therefore associated recording units A, are shown mounted on the crossbar 86. This is for illustrative purposes only, as these devices can be mounted on any suitable part of the machine.

The cylinders 3a in the arrangement of FIGS. 6 and 7 are floating and are held level in a horizontal plane by means of the weighted pendulum 87, shaft 76, crossbar 82 and shafts 79. Displacement of pistons 5a effect a similar displacement of the piston 18 in the cylinder 16 in the same manner as described above in connection with the device shown in FIG. 1. The information recorded is an indication of the cross level of the rails 2 at any given point along the rails.

The cylinders 3a are located in this instance between wheels 68 and 70. As the machine moves forward pistons 5a will move up or down depending on the cross level of the rails 2 at the point in question and will simultaneously actuate the recording units A. Conversely, it follows that if the track assembly is raised under the wheels 77, the associated recording or receiving devices A can be set to signify when the desired degree of cross level has been met.

The wheels 90 will follow the rail contour with respect to the contact point of the wheels 68 and 70. This upward and downward movement is simultaneously hydraulically transmitted to the recording or receiving devices associated with the cylinders 3b. It follows that should the rails 2 be forced upwards under wheels 90 the recording units A associated therewith will be activated accordingly, and signify the degree of movement of the wheels. Also this device could be used to correct variations in level between two points by suitable direction to the recording devices A thereby reversing the process.

In FIG. 8 the cylinders 3a' and 3b' correspond to the cylinders 3a and 3b in FIG. 6 and are disposed vertically in axial alignment with each other above each rail 2 of the track. The cylinders 3a' are floating with respect to the machine 67 while the cylinders 3b' are fixed on the machine.

In FIG. 10 the arrangement of the cylinders 3c and 3d is similar to the arrangement of the cylinders 3b' and 3a' in FIG. 8, except that they are disposed horizontally with the cylinder 3c being secured to the machine frame 67 while the cylinder 3d is floating. The wheel 90' is journalled on the shaft 97 while the opposite wheel 90'' is journalled on the shaft 98. The shafts 97 and 98 are restrained from rotating by the brackets 101 but are free for lateral movement. It follows that the variation in alignment of the rails 2 with respect to the point of contact of wheels 68 and 70 will move wheel 90', shaft 97 and piston 5c, thereby displacing hydraulic fluid accordingly. The recording units A associated with the cylinder 3c will thereby be activated to record alignment conversely, the alignment could be corrected by reversing the process.

As the cylinder 3d is free to float, it will be readily seen that any variation in the distance between the rails 2 will displace hydraulic fluid in cylinder 3d accordingly and activate the associated recording units A. As the gauge of the rails changes, the variations can be recorded accordingly. Conversely, the gauge could be corrected by reversing the process.

It can be readily seen that the recording units A incorporating the contact arrangement shown in FIG. 1 or the arrangements shown in FIGS. 3, 4 and 5, or any equivalent arrangement could be used in conjunction with a solenoid type of marking device e.g. radio active paint which would mark sense rails 2 according to distance, interruption by a metal object or time. Conversely a sensing device on say another machine equipped in a similar manner with a pick-up sensing device could be activated to provide corrective action as required.

The use of a machine or machines as above described, adapted to railway use is illustrative only and it will be readily seen that the unit or units can be adopted to sense or correct the variations of any surface or surfaces. Furthermore, it can be seen that the sensing mechanism can be stationary or moving with relation to the surface to be sensed which likewise can be stationary or moving.

The device of the invention also can be used to correct cross levels on a pair of parallel running rails being tamped. To accomplish this, two sensing units are mounted on a vehicle travelling along the tracks, one unit for each rail. A pendulum is fulcrumed on the frame of the vehicle midway between the two sensing units with a horizontal bar fixed to the pendulum at its fulcrum point. The ends of the horizontal bars are fixed to sleeves 30 of the two sensing units. If the electromagnet 31 is unenergized, it will be appreciated that any disparity in height between the two parallel rails at the point of contact of the wheels of the vehicle will cause contacts 41, 45 to close and activate a warning light or solenoid valve which in turn will allow manual or automatic control of the tampers at that particular point.

It will be appreciated that the surface follower wheel 9 in FIG. 1, may be positioned either between the wheels 90 and 70 movably supporting the frame 67 in FIG. 6 or in front of or behind them. Where the follower is positioned between the supporting wheels, the straight line distance between the wheels could be considered as the chord of a circle and the vertical variation of the surface would be the rise of the circle at a given point between the chords at a given point between the extremities of the chord.

In the case of the disclosed embodiment the device could be directly fixed to the tamper frame as indicated in FIG. 1 or it could be fixed to a vehicle running ahead of the tamper. In the latter situation a series of contacts with graduated gaps could, as they closed, feed information to a computer which could establish an optimum datum line as the vehicles progress along the track.

What I claim is:

1. A device for sensing the gauge and alignment of a surface, comprising a frame, a plurality of pairs of wheels movably supporting the frame on the surface, a first closed cylinder on the frame, said first cylinder being spaced from the wheels and having a first piston and a first piston rod reciprocable horizontally therein, a sensing wheel journalled on the free end of the first piston rod on one side of the cylinder and adjacent the surface, said first piston being biased with respect to the surface, a second floating closed cylinder, said second closed cylinder, having a piston and piston rod reciprocable horizontally therein, and biased with respect to the surface, the second cylinder being located in horizontal axial alignment with the said first cylinder, and the pistons in each of said first and second cylinders being connected together by a shaft, a shaft axially aligned with and connected to the said second cylinder and projecting in a direction opposite from said one side of the first cylinder, and a sensing wheel journalled on said latter mentioned shaft, sensing means associated with each of said first and second cylinders, each of said sensing means including a sensing cylinder, and conduits connecting the chambers of the first and second cylinders to said sensing cylinders, a piston and piston rod in said latter sensing cylinders, intake valve means to allow introduction and maintenance of hydraulic fluid under pressure in said first and second and sensing cylinders, the cylinder, piston, conduit and sensing wheels arrangement being biased with respect to the surfaces on introduction of pressurized hydraulic fluid into said first and second cylinders, the piston of the sensing cylinders moving in relation to the movement of the displacement of fluid in the first and second cylinders, and means on the piston rod of the sensing cylinders outside the cylinders to indicate the degree of movement of the first and second pistons relative to their respective cylinders.

References Cited

UNITED STATES PATENTS

| | | | |
|---|---|---|---|
| 2,832,148 | 4/1958 | Rousse | 33—144 |
| 367,708 | 8/1887 | Dudley | 33—146 |

FOREIGN PATENTS 1,163,203  2/1964  Germany.

LEONARD FORMAN, Primary Examiner

STEVEN L. STEPHAN, Assistant Examiner

U.S. Cl. X.R.

33—144; 104—8